United States Patent [19]

Sarton et al.

[11] Patent Number: 4,697,774
[45] Date of Patent: Oct. 6, 1987

[54] FASTENING DEVICE FOR ATTACHING AN OBJECT TO A SUPPORT

[75] Inventors: François Sarton, Totes; Gérard Roby, Bihorel, both of France

[73] Assignee: Legrand, Limoges, France

[21] Appl. No.: 673,367

[22] Filed: Nov. 20, 1984

[30] Foreign Application Priority Data

Dec. 9, 1983 [FR] France ............... 83 19782

[51] Int. Cl.⁴ .................................. G09F 3/18
[52] U.S. Cl. ............................ 248/221.4; 24/297; 24/573; 248/222.3; 248/224.4; 248/225.1
[58] Field of Search ........... 248/207, 221.4, 222.2, 248/222.3, 221.1, 224.4, 225.1; 24/297, 289, 573

[56] References Cited

U.S. PATENT DOCUMENTS

| | | | |
|---|---|---|---|
| 3,809,799 | 5/1974 | Taylor | 174/68 |
| 3,988,808 | 11/1976 | Poe et al. | 24/297 X |
| 4,212,445 | 7/1980 | Hager | 248/221.4 |
| 4,342,139 | 8/1982 | Tanaka | 24/297 X |
| 4,422,222 | 12/1983 | Notoya | 24/297 X |
| 4,506,419 | 3/1985 | Mitoni | 24/298 X |

FOREIGN PATENT DOCUMENTS

| | | | |
|---|---|---|---|
| 1107029 | 8/1958 | Fed. Rep. of Germany | 24/297 |
| 2717216 | 11/1978 | Fed. Rep. of Germany . | |
| 2416577 | 8/1979 | France . | |
| 2470562 | 11/1979 | France | 248/207 |
| 2516713 | 5/1983 | France . | |
| 7507037 | 12/1975 | Netherlands | 248/221.4 |

Primary Examiner—Robert W. Gibson, Jr.
Assistant Examiner—David L. Talbott
Attorney, Agent, or Firm—Charles E. Brown; Charles A. Brown

[57] ABSTRACT

A fastening device for attaching an object to a support comprises two separate parts, consisting of a base member which incorporates means for fastening it to the support and a head member which incorporates means for fastening it to the object. The base member and the head member conjointly comprise complementary snap fastener means adapted to fasten them to one another. The device is particularly suited to attaching a wiring channel or conduit to a perforated plate, a chassis upright or an electrical equipment cabinet door.

3 Claims, 19 Drawing Figures

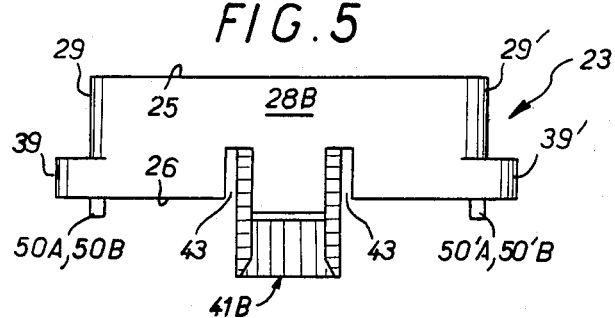
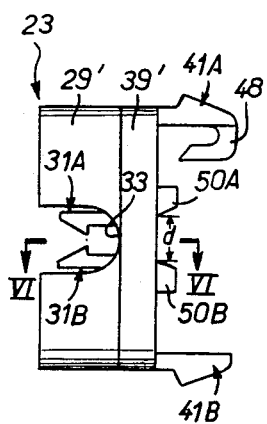
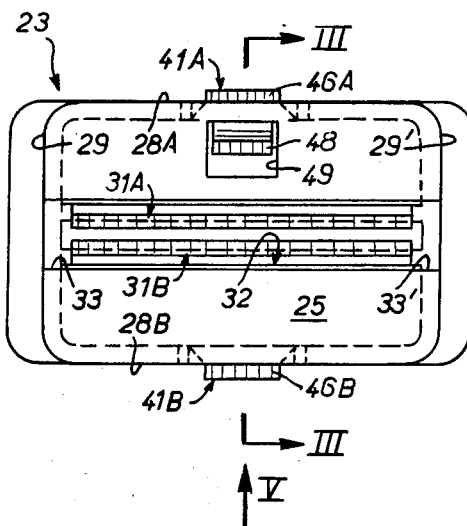
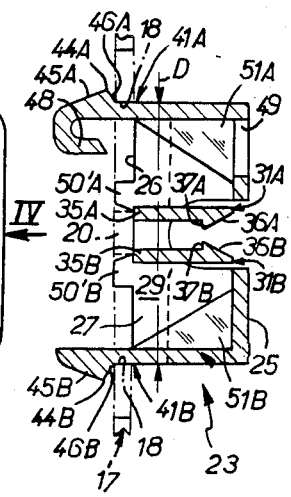
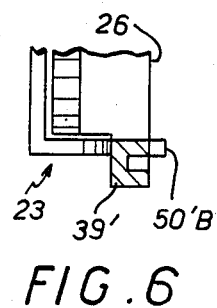
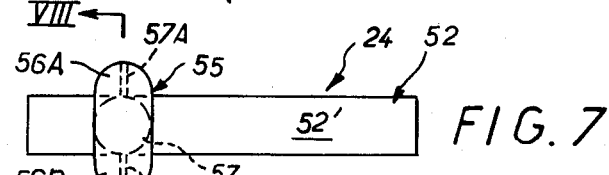
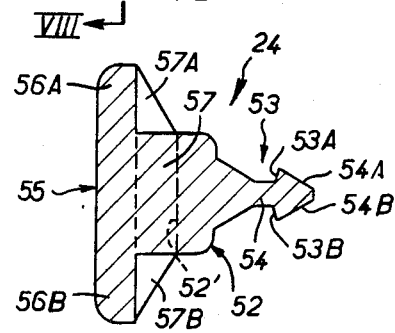

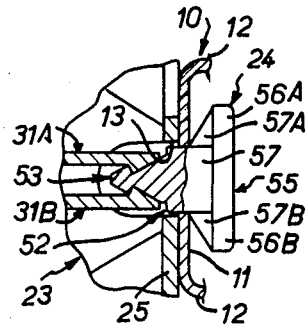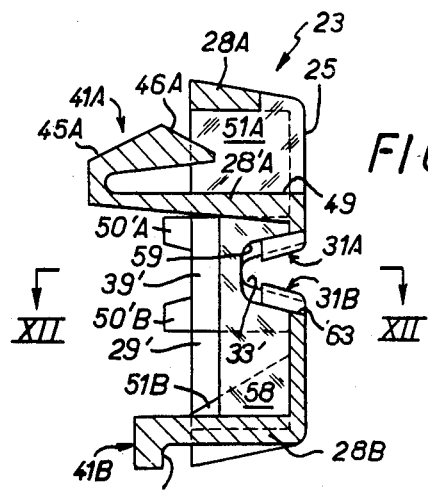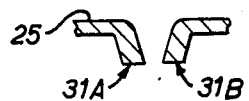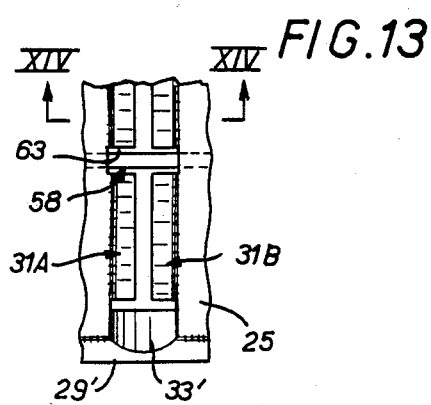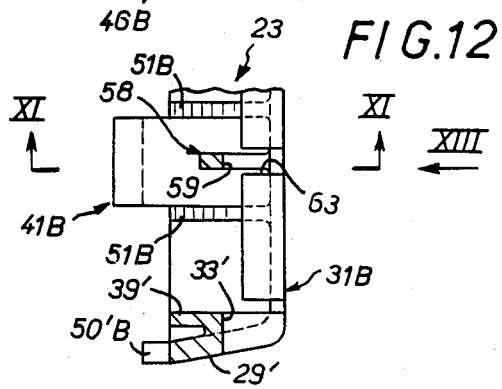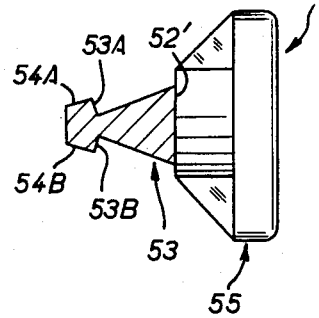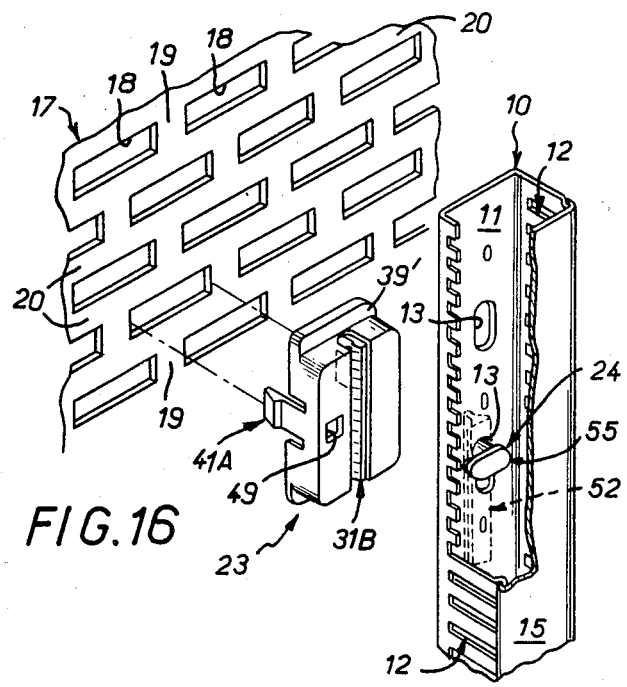

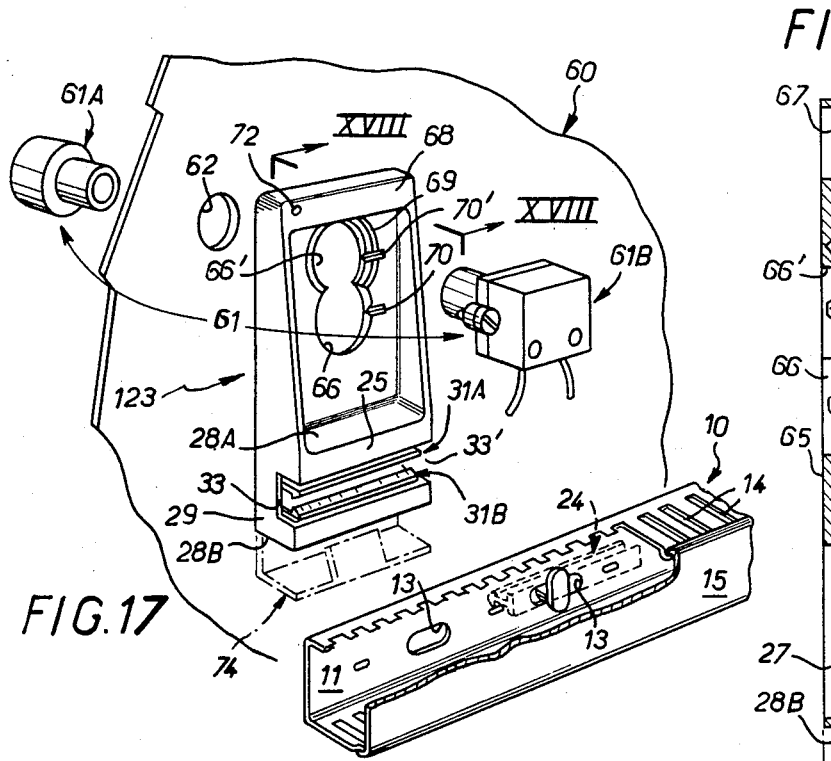
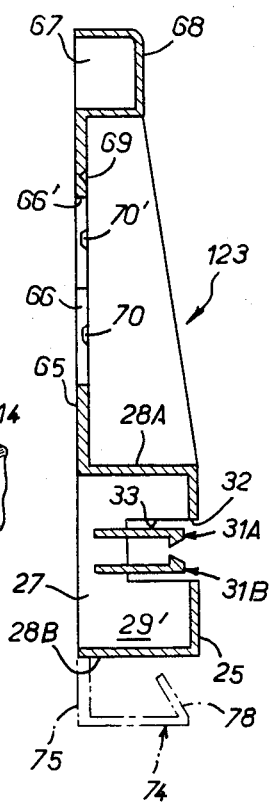
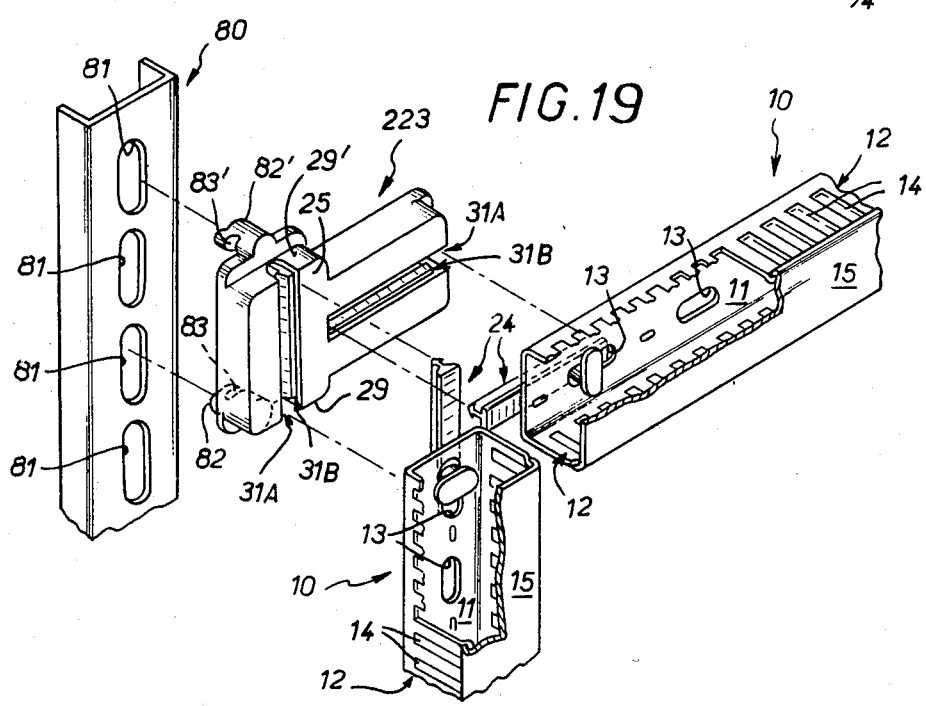

FASTENING DEVICE FOR ATTACHING AN OBJECT TO A SUPPORT

BACKGROUND OF THE INVENTION

1. Field of the Invention

The present invention is generally concerned with the attaching of any kind of object to any kind of support.

It is more particularly directed to the case where the object to be fastened is a channel of the kind routinely used to guide electrial conductors in electrical equipment cabinets, that is cabinets or cases used to accommodate any form of electrical equipment.

2. Description of the Prior Art

As is known, a channel of this kind, which may be made from a synthetic material, for example, conventionally has a generally U-shaped transverse cross-section with, along the axis of its bottom, at regular intervals defined by applicable standards, openings adapted to permit the passage of fastening members needed to attach it to a support of some kind.

More often than not these openings along the axis of the bottom are elongate slots, in particular to permit a limited degree of adjustment of the position of the channel relative to the support to which it must be attached.

The electrical equipment is accommodated in the cabinet and to this end there is first installed in the latter an appropriate dedicated support.

This may consist, for example, of a perforated plate, by which is meant a plate, generally of metal, formed with an array of holes, of rectangular contour in practice, separated from one another in one direction by crossmembers and in a second direction, orthogonal to the first, by bars.

Currently, a channel is attached to perforated plate of this kind more often than not using screws or rivets.

Such devices have usually to be taken from a bulk storage bin and this can result in costly time-delays and losses through clumsiness.

When screws are used, whether of metal or of a synthetic material, after being passed through the bottom of the channel and the perforated plate they must cooperate with a nut on the other side of the perforated plate.

Fitting them thus necessitates working behind the perforated plate and in practice this operation can be lengthy and awkward.

There has been made provision to attach them to the perforated plate in advance, by means of appropriate clips.

However, as the facility for adjusting the position of the channel is limited, costly fumblings remain inevitable.

The same applies to rivets, the use of which further involves the use of a special tool.

Finally, when such devices, whether screws or rivets, are of metal, they normally contravene the usual safety requirements since they result to some extent in the establishing of a metal bridge between the electrical conductors contained in the channel and the underlying perforated plate, to the detriment of the continuous insulation normally ensured by the bottom of a channel of this kind when of a synthetic material.

French Patent Application No. 78 02643 filed Jan. 31 1978 and published under the number 2 416 577 describes a fastening device which is used to attach a channel to a perforated plate and eliminates to a certain degree the disadvantages outlined hereinabove.

However, as this fastening device forms a variety of stirrup-shaped bracket of which the side members must encircle the flanges of the channel to be attached, engaging with these flanges snap fastener fashion by means of the slots which they usually feature for the electrical conductor(s) concerned to pass through, they are suitable only for specific channels, as their dimensions must be adapted to those of the latter.

Thus this is a fastener device of highly limited practical utilization.

Also, competing with electrical equipment cabinets equipped with a perforated plate are electrical equipment cabinets which, for supporting the electrical equipment which they are designed to contain, are equipped with a chassis formed by two uprights at the sides to which are attached transversely along their height profiled members, generally of metal, appropriate to the supporting function.

These profiled members generally have a generally U-shaped transverse cross-section, the flanges having the edges bent through a right angle to form rims for snap action engagement with the electrical equipment concerned, whether the flanges are of the same height, in which case the rims are usually outwardly directed, or of unequal height, in which case the rims are usually directed inwards.

Although such profiled members are well-suited to the fastening of electrical equipment, the same does not apply to the channels designed to accommodate the electrical conductors serving the equipment.

Apart from the very necessity for profiled members of this kind in order to support the channels, these members must be provided with adapter members to enable the channels to be attached to them.

As this attachment is effected using screws or rivets, as previously, and with screws more often than not in practice, the same disadvantages as described hereinabove result, in particular those of hesitation, clumsiness and fumbling.

Also, independently of the electrical equipment accommodated in the electrical equipment cabinet concerned, the door of the cabinet is usually equipped on the front with electrical components such as lamps, pushbuttons, switch levers and other display and/or control devices, connected to electrical conductors which must be routed along the length of the door.

Although certain of these conductors may be bound up with others by means of cable ties to constitute relatively rigid assemblies able to retain of themselves a stable configuration in contact with the door, without untidy or random routing of the conductors relative to the door, this does not necessarily apply to all the conductors and it is more often than not necessary to fasten them to the door for their protection and so that they are not inadvertently subject to tensile forces which may result in them being pulled off, given that they are to a greater or lesser extend in the way when the cabinet door is opened.

However, it is conjointly necessary to maintain the integrity of the door, for security and sealing reasons, which rules out the making of any holes in the door for the purposes of the necessary fastening, only holes which are indispensible to the fitting of electrical or other components to the door being permitted.

Currently, the electrical conductors connected to these components are more often than not bonded to the door, through the intermediary of either appropriate self-adhesive base members, the adhesion of which to the door is in practice mediocre, or appropriately bonded channels, the adhesion of which is satisfactory but which require a relatively complex gluing operation to install them.

It is also possible to fix uprights to the door along its edges adapted to enable the attachment of a profiled member to which a channel of this kind may be attached, to enable the channel to be fastened to a cabinet door.

However, apart from the necessity to use uprights and a profiled member in this case, the attachment to the latter of a channel necessitates as previously adapter members with the disadvantages specified hereinabove.

French Patent Application No. 81 21729 filed Nov. 18 1981 and published under the number 2 516 713 proposes to attach a channel to an electrical equipment cabinet door by profiting from one of the holes already made in the door for the installation of electrical or other components which it must carry.

To this end use is made of a fastening lug which features a passage enabling it to be attached to the door concerned by being clamped between the two parts which an electrical component to be attached to the door usually comprises. The lug also features a threaded hole for fastening a channel.

With a fixing lug of this kind a channel is fitted by means of screws, with all the disadvantages inherent to this method of fastening, as outlined hereinabove.

Also, in this case, the electrical components to be attached to the door must be disposed according to the intervals between the openings in the bottom of the channel, which may be unduly constraining.

In all cases, whether a channel is to be attached to a perforated plate or to a profiled member or to an electrical equipment cabinet door, independently of the specific disadvantages inherent to each of these supports, there is a risk of fumbling on fitting a channel given, on the one hand, the limited extent of the openings in the bottom of the channel enabling only limited adjustment of its position relative to the support and, on the other hand, the fact that it is more often than not necessary to manipulate the channel and the support virtually simultaneously.

These disadvantages are circumvented using the fastening base member which is described in French Patent Application No. 82 21807 filed Dec. 27 1982 and the first Patent of Addition Application thereto filed on Sept. 16 1983 under the number 83 147458.

However, this fastening base member is suitable only for attaching a channel to a profiled member, for which purpose it is specifically designed It may not be used to effect fastening to a perforated plate or to an electrical equipment cabinet door or to a chassis upright.

A general objective of the invention is to provide a system which eliminates the disadvantages of the usual forms of fastening device and confers additional advantages, being usable equally well in a fastening device for attaching a channel to a perforated plate or to an electrical equipment cabinet door or to a chassis upright.

SUMMARY OF THE INVENTION

The present invention consists in a fastening device comprising two separate parts consisting of a base member which incorporates means for attaching it to a support and a head member which incorporates means for attaching it to an object to be supported on the support, the base member and the head member conjointly comprising complementary snap fastener means adapted to attach them to one another.

Thus, the base member being fastened to the relevant support, on the one hand, and the head member being itself fastened to the object concerned, on the other hand, independently of the fixing of the base member to the support, it is not necessary to manipulate the support and the channel simultaneously in order to attach the channel to the support.

It is sufficient to offer up the channel fitted with its head member to the base member previously attached to the support concerned, until the head member and the base member are coupled together, such coupling being effected with a simple snap action, whereby the overall operation is particularly easy and fast to carry out.

The snap fastener means on the base member are preferably elongate and the head member is preferably adapted to move freely relative thereto along the length thereof whilst being fastened to the base member thereby.

This offers the advantage of an increased extent of adjustment of the position of the channel relative to its support, eliminating all fumbling on fitting the channel, and further constitutes a particularly simple solution to the problem of possible incompatibility between the distances between centers of the openings in the bottom of the channel and of the openings or recesses in the support to which it must be fastened.

In practice, when the support to which a channel must be attached in this way is a perforated plate, the base member of the fastening device is accordance with the invention comprises at least two fastening lugs adapted to enable it to be mounted with a snap action on the perforated plate, at least one of the fixing lugs being elastically deformable to this end.

In other words, in this case, the fastening means provided on the base member to enable it to be attached to a perforated plate consist of lugs of which at least one is elastically deformable.

In accordance with a further feature of the invention, use may with advantage be made of an arrangemment of the same kind for attaching a base member of this kind to a chassis upright.

Chassis uprights of this kind usually comprise regularly spaced openings or perforations.

In this case, it is sufficient to provide the base member of the fastening device in accordance with the invention with the fastening members adapted to be inserted in such openings or perforations, such fastening members thus providing for the attachment of a base member of this kind onto the chassis upright concerned with a simple snap action.

When, instead of being equipped with a perforated plate, the electrical equipment cabinet concerned is equipped with a chassis, there is with advantage no longer any necessity to use any form of profiled member for fastening on a channel.

The channel may be directly fastened to the uprights of a chassis of this kind using two fastening devices in accordance with the invention disposed at its respective opposite ends.

Finally, when it is a question of attaching a channel of this kind or any other object to the door of an electrical equipment cabinet, the base member of the fastening device in accordance with the invention may simply feature a lateral fastening baseplate adapted to be attached to the door by being clamped between two parts of any electrical or other component to be attached to the door, as mentioned hereinabove.

As previously, the mobility of the corresponding head member relative to the base member has the advantage that the position of the electrical component is virtually entirely independent of the gap between the openings in the bottom of the channel.

Other objects and advantages of the invention will appear from the following description of examples of the invention, when considered in connection with the accompanying drawings, and the novel features will be particularly pointed out in the appended claims.

BRIEF DESCRIPTION OF THE DRAWINGS

FIG. 2 is a plan view of the base member of this fastening device, in the direction of the arrow II in FIG. 1.

FIG. 3 is a view of the base member in transverse cross-section on the line III—III in FIG. 2.

FIG. 4 is an end view of it in the direction of the arrow IV in FIG. 2.

FIG. 5 is a view of it in elevation in the direction of the arrow V in FIG. 2.

FIG. 6 is a partial view of it in transverse cross-section on the line VI—VI in FIG. 4.

FIG. 7 is a plan view in the direction of the arrow VII in FIG. 1 of the head member associated with this base member in the fastening device in accordance with the invention.

FIG. 8 is a view of this head member in transverse cross-section on the line VIII—VIII in FIG. 7 and to a larger scale.

FIG. 10 is a partial view in transverse cross-section showing such attachment.

FIG. 11 is a view analogous to that of FIG. 3 relating to an alternative embodiment of the base member for the fastening device in accordance with the invention.

FIG. 12 is a partial view of this alternative embodiment in transverse cross-section on the line XII—XII in FIG. 11.

FIG. 13 is a partial plan view of it in the direction of the arrow XIII in FIG. 12.

FIG. 14 is another partial view of it in transverse cross-section on the line XIV—XIV in FIG. 13.

FIG. 15 is a view in transverse cross-section of the head member associated with this support member, to a different scale.

FIG. 16 is a view in perspective analogous to that of FIG. 9 relating to a further embodiment of the fastening device in accordance with the invention.

FIG. 17 is a view in perspective relating to a yet further embodiment of the fastening device in accordance with the invention adapted to attach a channel to an electrical equipment cabinet door.

FIG. 18 is a view of the base member which this embodiment of the fastening device in accordance with the invention comprises, in transverse cross-section on the line XVIII—XVIII in FIG. 16.

FIG. 19 is a view in perspective showing a still further embodiment of the fastening device in accordance with the invention adapted to attach one or more channels to a chassis upright.

DESCRIPTION OF THE PREFERRED EMBODIMENTS

As indicated hereinabove, these figures illustrate in a general way the application of the invention to the attachment, to a support to be described subsequently, of at least one channel 10 adapted to accommodate cables or other electrical conductors necessary for the operation of electrical equipment or apparatus.

A channel 10 of this kind is well known per se and as it does not of itself constitute the object of the present invention will not be described in detail here.

It suffices to mention that, comprising a bottom 11 and two flanges 12, it has a U-shape in transverse cross-section and, in the usual manner, its bottom 11 has regularly spaced along the median line longitudinal slots 13.

Figure 9:
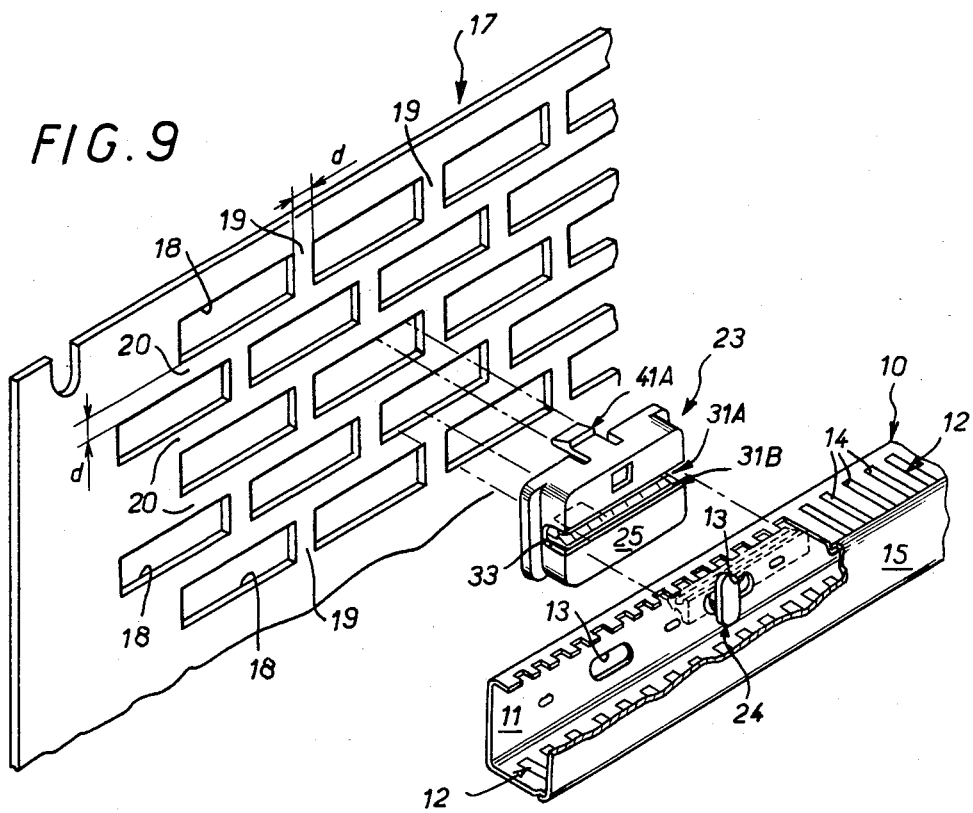
FIG. 9 is a view in perspective showing the use of the fastening device in accordance with the invention for attaching a channel to a perforated plate.

In the embodiment shown in FIGS. 9, 12, 17 and 19, the flanges 12 of a channel 10 of this kind are themselves formed with spaced transverse notches 14 for the cables or electrical conductors they accommodate to pass through and, to protect and retain these cables or electrical conductors, there is associated with the channel a cover 15 fitting over the edges of the flanges 12.

Figure 1:
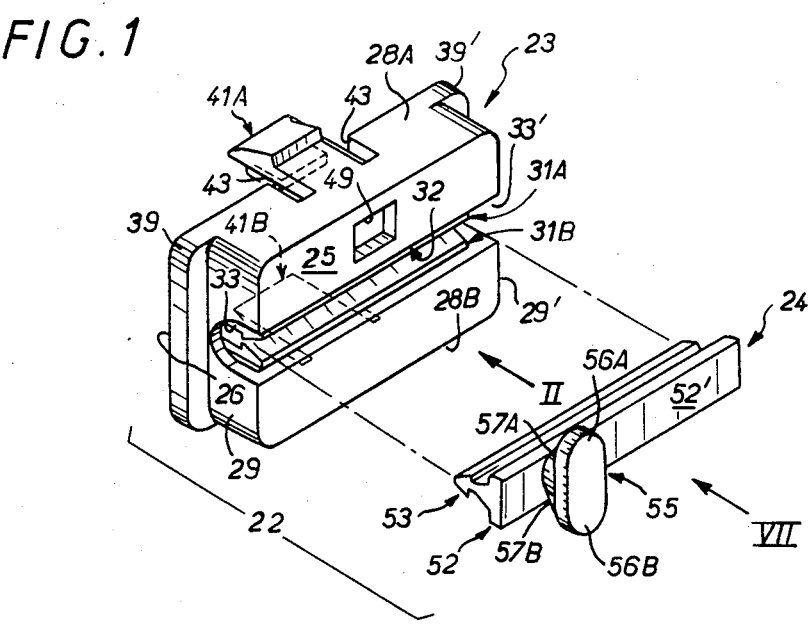
FIG. 1 is an exploded view in perspective of a fastening device in accordance with the invention.

In the application of the invention illustrated by FIGS. 1 through 12, the support to which a channel 10 of this kind must be attached is a perforated plate 17, that is to say a plate featuring an array of openings 18 separated from one another in a first direction by bars 19 and in a second direction, orthogonal to the preceding direction, by crossmembers 20.

In practice, in the embodiment shown, these openings 18 have a rectangular contour, they are offset relative to one another in a staggered arrangement in adjacent rows, and the bars 19 and crossmembers 20 which separate them have substantially the same width or height d.

The fastening device 22 utilized in accordance with the invention for attaching a channel 10 to a perforated plate 17 of this kind is generally characterized in that it is constituted of two separate parts consisting of, on the one hand, a base member 23 which is provided with fastening means adapted to enable it to be attached to a perforated plate 17 of this kind and, on the other hand, a head member 24 which is provided with fastening means adapted to enable it to be attached to the channel 10 to be attached to the perforated plate 17, said base member 23 and said head member 24 being conjointly provided with complementary snap fastener means adapted to attach them to one another.

The base member 23 has the general shape of a rectangular plate with rounded corners.

On the front it forms a plate 25 with a substantially plane surface for the channel 10 to rest against and, on its rear surface, parallel to the plate 25, it forms a baseplate 26 adapted to bear against the perforated plate 17.

In the embodiment shown, the base member 23 is hollow, the thus formed recess 27 opening on the same side as the baseplate 26 so that, in essence and excepting further explanations to be given hereinafter, the baseplate 26 is formed only by the edges of the longitudinal walls 28A and 28B, on the one hand, and the transverse walls 29 and 29', on the other hand, laterally bordering the plate 25 and substantially perpendicular thereto.

In practice, the snap fastener means with which the baseplate 23 is provided so that the associated head member 24 may be attached to it are elongate longitudinally, that is to say parallel to the longitudinal lateral walls 28A and 28B, along the median line of the plate 25.

They comprise two snap fastener teeth 31A and 31B which are elongate parallel to a slit 32 provided to this end in the plate 25 to provide access to them and themselves form the lips of a slit.

In the embodiment shown, the slit 32 in the plate 25 divides it longitudinally in two and is extended, by notches 33 and 33', over part of the height of the corresponding transverse lateral walls 29 and 29'.

Also, the snap fastener teeth 31A and 31B, which in practice are set back relative to the plate 25, extend longitudinally over substantially the full length of the slit 32 in the latter, between the transverse lateral walls 29 and 29'.

In the embodiments shown in FIGS. 1 through 10, the snap fastener teeth 31A and 31B are identical to one another and, separate from the plate 25, they are directed towards the latter from the interior of the base member 23.

In practice, they are formed by the edges of plates 35A and 35B which extend parallel to one another from one of the transverse walls 28 and 29' to the other, continuously with the baseplate 26 and thus, by virtue of their edge, forming part of the latter (FIG. 3).

Symmetrically to one another, the snap fastener teeth 31A and 31B comprise an oblique insertion ramp surface 36A, 36B and a retaining notch 37A, 37B intersecting this insertion ramp surface 36A, 36B.

By virtue of the notches 33 and 33' in the transverse lateral walls 29 and 29', within the overall contour of which they are disposed on lateral projection (FIG. 4), they are both elastically deformable.

Preferably, and as shown, the base member 23 features, at the base of at least one of these transverse lateral walls 29 and 29', and in practice at the base of each of the latter, below the corresponding notch 33, 33' and thus at each end of the slit defined by the plate 25 and the snap fastener teeth 31A, 31B, a stiffener ledge 39, 39', respectively.

In the embodiments shown in FIGS. 1 through 12, the stiffener ledges 39, 39' which the base member 23 thus feature are external to the interior volume of the latter, projecting externally on its corresponding transverse lateral walls 29, 29'.

In practice, a stiffener ledge 39, 39' of this kind, which is hollow, with its open side towards the baseplate 26, extends from the baseplate 26 and thus, by virtue of its edge, forms part of the latter.

In the embodiments shown, the fastening means which the base member 23 comprises for attaching it to the perforated plate 17 are constituted by two fastening lugs 41A, 41B adapted to enable it to be fastened with a snap action to a perforated plate 17 of this kind.

In practice, these fastening lugs 41A, 41B project from the baseplate 26, in line with the median part of the corresponding longitudinal lateral walls 28A, 28B.

At least one of them is elastically deformable.

In the embodiment shown in FIGS. 1 through 10, this applies to one or the other of the fastening lugs 41A, 41B.

To this end, each of them is in practice formed by an extension of the corresponding longitudinal lateral wall 28A, 28B, to each side of which is a slit 43 delimiting it laterally and by virtue of which it is set into the transverse dimension of the longitudinal lateral wall 28A, 28B.

Each of the fastening lugs comprises an outwardly projecting retaining bead 44A, 44B formed by an oblique insertion ramp surface 45A, 45B and a retaining notch 46A, 46B intersecting the insertion ramp surface 45A, 45B.

In the embodiments shown in FIGS. 1 through 10, one of the thus constituted fastening lugs 41A, 41B, in practice the fastening lug 41A, is extended by a crook-shaped return 48 directed towards the internal volume of the base member 23, in line with a rectangular opening 49 provided in the plate 25 of the base member 23 to provide access to it.

In practice, the base member 23 further comprises at least one pair of pegs projecting from its baseplate 26, or more precisely from the edge of its transverse lateral walls 29, 29'.

In the embodiments shown, there is therefore provided, projecting from the edge of each of the transverse lateral walls 29, 29', in corresponding relationship to one another, a respective pair of pegs 50A-50B, 50'A-50'B.

The pegs 50A-50B and 50'A-50'B of each pair have oblique surfaces facing one another, converging towards one another in the direction towards the baseplate 26.

It will be understood that the distance D between the longitudinal lateral walls 28A, 28B, and thus between the corresponding fastening lugs 41A-41B, as measured between the outside surfaces of the latter, is substantially equal to that separating the opposite edges of two adjacent openings 18 in the perforated plate 17 encompassing a crossmember 20 of the latter.

Likewise, the distance d between the two pegs 50A-50B, 50'A-50'B of the same pair of substantially equal to the width or height of the bars 19 and crossmembers 20 of the perforated plate 17.

Finally, in the embodiment shown in FIGS. 1 through 10, the base member 23 comprises two pairs of internal stiffener ribs 51A, 51B, disposed with one rib on each side of each fastening lug 41A, 41B and constituting a triangular fillet linking the plate 25 to the corresponding longitudinal wall 28A, 28B.

In the embodiments shown in FIGS. 1 through 12, the head member 24 associated with the base member 23 comprises a body 52 in the form of an elongate strip member the shape of which relates to that of the slit 32 in the plate 25 in the base member 23.

The snap fastener means which it comprises to cooperate with the snap fastener teeth 31A, 31B of the base member 23 are constituted by a snap fastener boss 53 which forms a longitudinal rib projecting along the median line of one of the principal surfaces of the strip member constituting its body 52 and which has an arrowhead-shaped transverse cross-section adapted to be clamped between the snap fastener teeth 31A, 31B.

The snap fastener boss 53 therefore features transverse retaining notches 53A, 53B intersecting respective oblique insertion ramp surfaces 54A, 54B, beyond a neck 54 of reduced width which is nevertheless greater than the gap between the unflexed snap fastener teeth 31A, 31B of the base member 23.

For attachment to the channel 10, the head member 24 comprises, projecting from the other side of the plane surface 52' which constitutes its body 52 relative to its snap fastener boss 53, fastening means in the form of a fastening boss 55 which is elongate transversely to the body 52 and thus to the snap fastener boss 53, forms two arms 56A, 56B on either side of the latter, and is joined to said plane surface 52′ by a neck 57.

In plan view, the contour of the fastening boss 55 is complementary to that of the openings 13 in the channel 10, whilst being smaller than the latter, and it envelopes the contour of the associated neck 57.

Thus the snap fastener boss 55 of the head member 24 is adapted to permit engagement of the head member 24 with the channel 10, by means of an opening 13 in the bottom 11 of the channel. The head member 24 is for this purpose offered up transversely relative to the outside of the bottom of the channel. When the head member 24 is engaged with the channel 10 it is rotated through one quarter-turn relative to the channel, the head member 24 being then aligned with its body 52 along the median line of the bottom 11 of the channel 10. On the other side of the channel bottom 11, the arms 56A, 56B of the fastening boss 55 grip the bottom 11, extending sideways (relative to the channel) beyond the contour of the opening 13 in which it is inserted.

In practice, as shown in FIG. 10, and for eventual adaptation to differences in the thickness of the bottom 11 of the channel 10, there are provided on the inside surface of the arms 56A, 56B ribs 57A, 57B which are elastically deformable and form triangular fillets joining the arms 56A, 56B to the associated neck 57. They are able to deform on engagement of the head member 24 with the channel 10 according to the process described hereinabove.

As will have been noted, such engagement is effected very quickly and very easily, without any fumbling, only the head member 24 and the channel 10 having to be manipulated.

Similarly, the fastening of a base member 23 to the perforated plate 17 is effected very quickly and easily, without any fumbling.

To this end it is only necessary to engage the base member 23 on the perforated plate 17, by means of the fastening lugs 41A, 41B, employing two adjacent openings 18 in the latter.

Such engagement is facilitated by the ramp surfaces 45A, 45B which the fastening lugs 41A, 41B comprise for this purpose, on the one hand, and by the pegs 50A–50B, 50′A–50′B, on the other hand, which fit over the crossmember 20 between the openings 18 in the perforated plate 17 concerned.

Finally, all that is needed to attach the channel 10 to the perforated plate 17 is to attach to the base member 23 carried by the perforated plate 17 the head member 24 carried by the channel 10.

Involving only a simple snap action, which can easily be carried out blind where necessary, this attachment is also effected very easily and quickly.

As will be noted, while being attached to the base member 23 by its snap fastener rib 53, the head member 24 can move freely relative to the latter, parallel to its length.

The result of this is an extensive capacity for adjustment of the position of the channel 10 relative to the perforated plate 17.

This is further enhanced by the fact that, in a preferred embodiment and as shown, the fastening boss 55 which the head member 24 comprises is offset longitudinally relative to the median area of the strip member which forms the body 52, and thus relative to the snap fastener boss 53, which provides for a longitudinal offset of the head member 24 relative to the base member 23, to one side of the latter, whilst retaining the fastening boss 55 of the head member 24 within the overall contour of the plate 25 of the base member 23.

By virtue of this considerable capacity for adjusting the position of the channel 10 relative to the perforated plate 17, the positioning on the channel 10 of the head member 24, on the one hand, and that of the base member 23 relative to the perforated plate 17, on the other hand, may in practice be more or less approximate, further reducing fumbling when they are fitted to the channel 10 and the perforated plate 17, respectively.

In other words, it is advantageously possible by virtue of the invention to make do with an approximate and therefore fast positioning of the base member 23 and/or the head member 24 associated with it.

In practice, two or more fastening devices in accordance with the invention are used to attach the channel 10 to the perforated plate 17, arranged along the length of the channel 10.

On completion of such attachment, the position of the channel 10 relative to the perforated plate 17 is firmly assured by virtue, in particular, of the braking action achieved by virtue of the snap fastener teeth 31A, 31B of each base member 23 employed gripping the snap fastener rib 53 of the corresponding head member 24, such braking effect advantageously opposing any unduly easy longitudinal displacement of the head members 24 relative to their respective base members 23.

However, if necessary, it remains possible to slide the channel 10 relative to the perforated plate 17 by hand so that, the head members 24 that it carries then escaping from the corresponding base members 23, they may be released from the perforated plate 17.

Conjointly, each base member 23 may itself be disengaged from the perforated plate 17 using the blade of a tool such as a screwdriver, for example, applied to the crook-shaped return 48 associated with the fastening lug 41A of the base member 23.

In the embodiment shown in FIGS. 11 through 14, only this fastening lug 41A is elastically deformable, the associated fastening lug 41B being then sufficiently massive to be relatively rigid, there being, furthermore, no slit provided for setting it into the corresponding longitudinal lateral wall 28B, which is itself thickened in consequence.

In practice, the retaining notch 46B which this fastening lug 41B comprises is straight, substantially perpendicular to the fastening lug 41B and with no oblique insertion ramp surface, being fitted to a perforated plate 17 by hooking the fastening lub 41B onto the latter and then pivoting it relative to the edge concerned of the corresponding opening 18 in the perforated plate 17, until the associated fastening lug 41A snaps into place. Also, in this embodiment, the fastening lug 41A, which is thus the only one elastically deformable, is formed not by an extension of the longitudinal lateral wall 28A, but by a crook-shaped return locally extending, in line with the opening 29 in the plate 25, an intermediate wall 28′A parallel to said longitudinal transverse wall 28A.

It comprises an oblique insertion ramp surface 45A and the retaining notch 46A which follows on from this is also highly oblique, forming an open dihedral with the oblique insertion ramp surface 45A.

As previously, stiffener ribs 51A, 51B frame the fastening lugs 41A, 41B thus constituted; they are triangular for the fastening lug 41B, as previously, but rectangular for the fastening lug 41A, joining to the plate 25 both the lateral transverse wall 28A and the intermediate wall 28′A.

Also as previously, a stiffener ledge 39, 39' is provided at each end of the slit which the plate 25 and the snap fastener teeth 31A, 31B form; but, in this embodiment, the stiffener ledges 39, 39' are inside the internal volume of the base member 23 concerned, projecting towards one another from the internal surface of the corresponding transverse lateral walls 29, 29', and they are of only limited extent, affecting only the median part of said transverse lateral walls 29, 29', substantially in line with the corresponding pegs 50A, 50'A, 50B, 50'B.

Moreover, in this embodiment, there is provided within the internal volume of the base member 23 concerned, substantially parallel to its transverse lateral walls 29, 29', a transverse stiffener 58 which links the intermediate wall 28'A to the longitudinal lateral wall 28B.

It consists in practice of a partition which, substantially perpendicular to the walls 28'A, 28B which it joins, and rooted on the internal surface of the plate 25, features a notch 59 in line with the snap fastener teeth 31A, 31B, in the same way as the longitudinal lateral walls 29, 29', but of greater extent laterally than the latter.

This stiffener has a two-fold advantage in that on the one hand it increases the pull-off resistance of the fastening lugs 41A and 41B and that on the other hand it increases the overall strength of the base member 23 concerned.

Also, in the embodiment shown in FIGS. 11 through 14, the snap fastener teeth 31A, 31B are in one piece with the plate 25, each forming an extension of the plate 25 in the direction towards the internal volume of the base member 23.

However, to allow for the provision of the stiffener 58, the snap fastener teeth 31A, 31B are locally interrupted, in their median area, in line with the latter, by a transverse groove 63 adapted to provide for the passage of the mold slide needed during molding to form the notch 59 in the stiffener 58.

In this embodiment, the external surface at least of the lateral walls 28A, 28B, 29, 29' is tapered to facilitate molding.

FIG. 15 concerns an alternative embodiment of the head member 24.

In this embodiment, the body of the head member 24 is reduced to the snap fastener boss 53 which, as previously, forms an elongate rib with an arrowhead-shaped transverse cross-section with retaining notches 53A, 53B and oblique insertion ramp surfaces 54A, 54B adapted for clamping engagement with the snap fastener teeth 31A, 31B of the associated base member 23.

However, the point of this cross-section is truncated by a broad flat.

Be this as it may, the rib which constitutes the snap fastener boss features a plane surface 52' which, instead of the body 52, forms a bearing surface for the bottom 11 of the channel 10 to be gripped, with a fastening boss 55 analogous to that previously described projecting from this plane surface 52'.

In the foregoing it has been assumed that, as the channel 10 must be implanted parallel to the length of the openings 18 in the perforated plate 17, the base members 23 used for this purpose are themselves attached to the perforated plate 17 parallel to this length.

FIG. 16 shows a disposition of the channel 10 at right angles to the preceding disposition, with the dimensions concerned determined accordingly. The base member 23 of each of the fastening devices 22 employed may, as shown, be disposed perpendicular to the length of the openings 18 in the perforated plate 17, its fastening lugs 41A, 41B then engaging the opposite edges of the same opening 18 in the perforated plate 17 whereas the pegs 50A–50B, 50'A–50'B then fit over a bar 19 of the perforated plate 17 rather than a crossmember 20 of the latter.

In all other respects the implementation is identical to that previously described.

FIGS. 17 and 18 illustrate the application of the invention to the situation where the support to which the channel 10 must be attached is formed by the door 60 of an electrical equipment cabinet to be equipped with an electrical component 61 constituted by two separate parts, namely a head 61A and a body 61B, and adapted to be attached to a door 60 of this kind by simply clamping it, being passed through a hole 62 provided for this purpose in the door 60.

This component may comprise a lamp, for example.

Be this as it may, the head 61A is its only part visible from the outside of the electrical equipment cabinet concerned, the body 61B remaining inside the latter, and the head 61A is adapted to be engaged, as by screwing, for example, on the body 61B, passing through the door 60 by virtue of the hole 62 in it, in order to clamp the door 60.

These arrangements are well known per se and as they do not of themselves constitute part of the present invention they will not be described in more detail here.

To attach the channel 10 to the door 60 use is made in accordance with the invention of a fastening device comprising, on the one hand, a base member 123 described hereinafter and, on the other hand, a head member 24 identical to that already described.

Like the previous base member 23, the base member 123 comprises on the front a plate 25 in which is a slit 32 which is extended laterally by notches 33, 33' in the corresponding transverse lateral walls 29, 29'

Internally, and also by virtue of arrangements identical to the previous ones, or very simliar thereto, it comprises two snap fastener teeth 31A, 31B which, in the embodiment shown, are separate from the plate 25 but which in an alternative embodiment could equally well be in one piece with the latter.

For attaching it to the cabinet door 60, the base member 123 features laterally a fastening baseplate 65 adapted to be attached to the door 60 by simply clamping it between the two parts 61A, 61B constituting the electrical component 61 concerned, the baseplate 65 featuring to this end at least one opening 66 adapted to have the component 61 pass through it, in the same way as the passage 62 in the door 60, or a location adapted to accommodate an opening 66 of this kind.

In the embodiment shown, the fastening baseplate 65 which thus constitutes the fastening means of the base member 23 extends along the base of only the longitudinal lateral side wall 28A of the latter.

In addition to the longitudinal lateral wall 28A, the baseplate 65 is bordered by extensions of the transverse lateral walls 29, 29' and, at the extremity of these extensions, by a ledge 68 which, in the embodiment shown, is hollow with its open side 67 facing the same way as the open side 27 of the base member 123.

In the embodiment shown the fastening baseplate 65 in practice features two openings 66, 66' staggered in height and intersecting one another to form a figure-of-eight shape.

These openings 66, 66', which have a circular contour, have substantially the same diameter, but one of them, in this instance the opening 66', is at least partially surrounded by a weakened area 69 enabling it to be enlarged if required.

In practice, this consists of a simple groove at a distance from its edge.

As will be readily understood, this groove 69 makes it possible to detach by simply pressing in or cutting away the part of the fastening baseplate 65 which is disposed between it and the contour of the opening 66' which its surrounds.

Alternatively, there could be substituted for it, as a weakened area, a section of reduced thickness, also adapted to be removed by simply pressing it in or cutting it away.

Opening transversely into each of the openings 66, 66' is a groove or notch 70, 70' for grounding the electrical component 61 concerned when this is necessary, utilizing a screw provided for this purpose.

As shown, the ledge 68 may comprise, on the front, at least one hole 72 for reasons which will emerge hereinafter.

When the electrical components 61 is fastened on, the fastening baseplate 65 of the base member 123 is clamped, conjointly with the door 60, between the two parts 61A, 61B constituting the electrical component 61.

According to the required location, the electrical component 61 passes through the appropriately selected one of the openings 66, 66' which the fastening baseplate 65 features for this purpose, enlarged if necessary in the case of the opening 66'.

As will be readily understood, choosing between the openings 66, 66' in the fastening baseplate 65 of the base member 123 offers the advantage of permitting installation of the electrical component 61 according to either of two distances between centers relative to the base member 123 and thus relative to the channel 10 subsequently attached to the latter.

In an embodiment which is not shown the fastening baseplate 65 is not formed in advance with any opening 66, 66', but merely a location adapted to accommodate an opening, so as not to impose any restriction on the user in this regard.

Be this as it may, the attachment of a channel 10 to the base member 123 thus constituted is effected in the same way as previously described.

The hole 72 in the ledge 68 associated with the base member 123 may be beneficially employed, if required, to accommodate a threaded stud locked into it by means of a nut and constituting a stand-off to which may be locked by means of two more nuts a screening plate parallel to the door 60 and covering all the base members 123 fitted to the door 60 and the channels 10 carried by the latter.

Also, and as schematically represented in chain-dotted lines in FIGS. 17, 18, the base member 123 may be extended on the same side as its longitudinal lateral wall 28B by a cradle 74 of which the bottom 75 is in the same plane as its fastening baseplate 65 and of which the outlet, towards the front, is at least partly covered by an elastically deformable lug 78, the cradle 74 being beneficially employable for the temporary installation, prior to the fitting of the channel 10, of the cables or electrical conductors connected to the electrical component 61.

FIG. 19 illustrates the application of the invention to the direct fastening of one or more channels 10 to any chassis upright 80 featuring, on the front, along its median line, regularly spaced openings 81 which, in the embodiment shown, are elongate slots.

The fastening device employed to this end in accordance with the invention comprises, on the one hand, a base member 223, described hereinafter, and on the other hand a head member 24 identical to that previously described.

Essentially, the base member 223 is overall similar to that described with reference to FIGS. 1 through 10, possibly with the variation as described with reference to FIGS. 11 through 14.

However, instead of featuring fastening lugs in the median part of its longitudinal lateral walls 28A, 28B, it comprises in the median part of its transverse lateral walls 29, 29' fastening members 82, 82' adapted to its attachment with a snap action to the chassis upright 80, by engagement with two separate openings 81 in the chassis upright 80.

For example, each of the fastening members 82 may feature facing transverse grooves 83, 83' adapted to engage the edge of the corresponding opening 81 in the chassis upright 80.

Also, in the embodiment shown, the base member 223 comprises at least two sets of snap fastener means so that a head member 24 may be disposed at a selected one of at least two distinct locations on it.

In practice, its plate 25 being generally T-shaped, it comprises, as previously, on the one hand, snap fastener teeth 31A, 31B which are elongate in the direction of the median line of the bar of the T-shape of the teeth thus formed by this plate 24 and, on the other hand, snap fastener teeth 31A, 31B elongate in the median direction of the upright of the T-shape of the teeth, and thus in a direction orthogonal to the preceding direction.

Thus, as shown, it is possible either to install a channel 10 according to one or other of two possible orthogonal directions, one parallel to the chassis upright 80 and the other perpendicular to the latter, as mentioned hereinabove, or to install two separate channels 10 simultaneously, according to respective ones of these two possibilities.

Be this as it may, and as it is easy to understand, when a channel 10 of this kind is installed perpendicularly to the chassis upright 80, it may thus extend directly from one chassis upright 80 of this kind to the chassis upright 80 associated with the latter, without the previous fitting between these chassis uprights 80 of any profiled member to support it.

It will be understood that various changes in the details, materials and arrangements of parts which have been herein described and illustrated in order to explain the nature of the invention may be made by those skilled in the art within the principle and scope of the invention as expressed in the appended claims.

For example, the head member which the fastening device in accordance with the invention comprises is not necessarily elongate, although it is in the preferred embodiments specifically described and represented.

For the preferred ease of adjustment in position, it is sufficient for the snap fastener means with which the base member of the fastening device are provided to be elongate.

Finally, the fastening boss which a head member of this kind comprises is not necessarily offset longitudinally relative to the median part of its body.

We claim:

1. A fastening device comprising two separate parts, one of said separate parts comprising a base member having means for attaching said base member to a support and the other of said separate parts comprising a head member adapted to be connected to an apertured member, said base member and said head member having complementary snap fastening means for attaching said base member and said head member together, said head member having a fastening boss projecting away from its snap fastening means, said fastening boss being adapted to be inserted into and turned in an opening in an apertured member for attaching the latter, said snap fastening means on said base member being elongated in an elongate direction, said fastening boss extending transversely relative to said elongate direction of said snap fastening means when said head member is attached to said base member, and said snap fastening means mounting said head member for movement in said elongate direction for adjusting the position of said head member relative to said base member, said snap fastening means on said base member comprising two snap fastener teeth, at least one of said snap fastener teeth being elastically deformable, said snap fastening means on said head member comprising a snap fastening boss cooperable with said snap fastener teeth, said base member having an interior and including a front bearing plate against which an apertured member is adapted to bear, said snap fastener teeth being set back relative to said front bearing plate, said snap fastener teeth being in one piece with said front bearing plate, each snap fastener tooth constituting an extension of said front bearing plate towards said base member interior, and said base member comprising a transverse internal stiffener, a transverse groove interrupting said snap fastener teeth midway along said snap fastener teeth in a length direction and being aligned with said transverse internal stiffener.

2. A fastening device comprising two separate parts, one of said separate parts comprising a base member having means for attaching said base member to a support and the other of said separate parts comprising a head member adapted to be connected to an apertured member, said base member and said head member having complementary snap fastening means for attaching said base member and said head member together, said head member having a fastening boss projecting away from its snap fastening means, said fastening boss being adapted to be inserted into and turned in an opening in an apertured member for attaching the latter, said snap fastening means on said base member being elongated in an elongate direction, said fastening boss extending transversely relative to said elongate direction of said snap fastening means when said head member is attached to said base member, and said snap fastening means mounting said head member for movement in said elongate direction for adjusting the position of said head member relative to said base member, said base member having at least two of said snap fastening means, and said head member being selectively attachable in each of said snap fastening means in said base member.

3. Device according to claim 2, wherein said snap fastening means are each elongated in an elongate direction on said base member, and said elongate directions are at an angle to each other.

* * * * *